United States Patent
Ohlson et al.

[11] Patent Number: 5,638,361
[45] Date of Patent: Jun. 10, 1997

[54] FREQUENCY HOPPED RETURN LINK WITH NET ENTRY CHANNEL FOR A SATELLITE PERSONAL COMMUNICATIONS SYSTEM

[75] Inventors: John Ohlson, Mt. View, Calif.; Francis D. Natali, Pt. Townsend, Wash.

[73] Assignee: Stanford Telecommunications, Inc., Sunnyvale, Calif.

[21] Appl. No.: 384,537

[22] Filed: Feb. 8, 1995

[51] Int. Cl.$^6$ ........................................... H04J 13/06
[52] U.S. Cl. .................. 370/342; 370/350; 375/201; 375/202
[58] Field of Search ......................... 370/100.1, 104.1, 370/95.1, 18; 375/202, 205, 201

[56] References Cited

U.S. PATENT DOCUMENTS

| | | | |
|---|---|---|---|
| 5,193,102 | 3/1993 | Meidan et al. | 375/202 |
| 5,245,612 | 9/1993 | Kachi et al. | 370/104.1 |
| 5,245,634 | 9/1993 | Averbuch | 370/104.1 |
| 5,363,110 | 11/1994 | Inamiya | 342/357 |
| 5,392,450 | 2/1995 | Nossen | 370/104.1 |
| 5,463,659 | 10/1995 | Nealon et al. | 375/202 |
| 5,469,468 | 11/1995 | Schilling | 375/202 |
| 5,506,863 | 4/1996 | Meidan et al. | 375/202 |

*Primary Examiner*—Douglas W. Olms
*Assistant Examiner*—Min Jung
*Attorney, Agent, or Firm*—Jim Zegeer, Esq.

[57] ABSTRACT

A satellite network communication system in which a plurality of subscriber handset terminals communicate with a ground hub station on traffic frequency channels using spread spectrum orthogonal CDMA transmissions. The hub station includes a control generator for generating a net entry control channel for communicating synchronization correction signals (timing, frequency and power) to subscriber handset terminals and a return link receiver. Each subscriber handset terminal has a subscriber unit control channel receiver for receiving the control channel synchronization correction signals and a subscriber unit return link transmitter connected to receive the synchronization correction signals so that signals from all subscriber handset terminals arrive at the hub station in time, power and frequency synchronism. The subscriber unit return link transmitter includes frequency hopped spread spectrum carrier such that none of the signals occupies the same frequency bin at the same time. The net entry control channel transmits small time and frequency correction signals to each of the plurality of subscriber handset terminals.

8 Claims, 3 Drawing Sheets

FREQUENCY HOPPED RETURN LINK WITH NET ENTRY CHANNEL FOR A SATELLITE PERSONAL COMMUNICATIONS SYSTEM

BACKGROUND AND BRIEF DESCRIPTION OF PRIOR ART

Spread spectrum communications is presently being used for a number of commercial applications and is expected to proliferate as the demand for untethered communications increases.

A number of consortiums have been formed to develop satellite based Personal Communications Systems (PCS) with global coverage. Some examples of these systems include Globalstar (Globalstar System Application before the FCC by Loral Cellular Systems, Corp., Jun. 3, 1991) and Odyssey (Application of TRW Inc. before the FCC to Construct a New Communications Satellite System "Odyssey," May 31, 1991), among others. The intent of these systems is that a subscriber can place telephone calls directly through the satellite network from almost anywhere on the Earth, using a portable handset much like the present cellular telephones. Both of the systems mentioned intend to use spread spectrum CDMA techniques for a number of reasons.

The return link signal, as proposed in the above filings, is direct sequence (DS) CDMA spread spectrum. This type of signaling, while having some desirable characteristics, suffers from a number of disadvantages for satellite PCS application. Among these are the difficulty of rapid acquisition, the sensitivity of system capacity to power control error, and the Eb/No degradation due to access noise (these systems typically require Eb/No>8 dB at BER=0.001 in order to achieve reasonable user capacities).

OBJECTS OF THE INVENTION

The invention serves several functions. These are summarized as:

Provide a robust return link that is readily acquired and synchronized.

Provide a return link signal that is very power efficient.

Provide a return link that is essentially free of access noise.

Provide a return link operation that is very insensitive to power control errors.

Provide a return link that has very high user capacity.

Provide means for readily accessing a CDMA network on a noninterfering basis without prior time and frequency synchronism.

Allows the hub station to detect and synchronize the user before assigning him a traffic channel.

Provides the user with a high link margin in-band channel for net entry requests.

SUMMARY OF THE INVENTION

The hub station of a satellite communication network receives a multiplicity of spread spectrum signals from the subscriber terminals. Each of these signals (on a particular frequency channel) is composed of data symbols which are transmitted via a FH carrier. These signals are synchronized to arrive at the hub station in time and frequency synchronism. The signal carriers employ orthogonal hopping patterns, i.e. none of the signals occupies the same frequency bin at the same time. The orthogonal properties of the signals allow them to be demodulated without access noise from co-channel signals. This is called orthogonal frequency hopping (OFH). Nonsynchronous users on this channel cannot be demodulated by the ground station due to the high level of access noise for a nonorthogonal user. A separate in-band Net Entry Channel (NEC) is provided for initial synchronism of users. Spread spectrum signals on this channel can be received by the hub station free of access noise from the traffic channels. Further, the NEC signals do not interfere with the traffic channel users despite initial timing and frequency errors. The return link signals are maintained in synchronism by transmitting small time and frequency corrections to each user from the GS via the inband control data on the outbound signal. The correction gain and update rate may be different for each user and may even be adaptive if user dynamics vary widely. Efficient data demodulation is performed despite phase discontinuities at the hop transitions by the use of block frequency and phase estimation techniques (i.e. feed-forward estimation is used as opposed to a phase-locked loop which has unpredictable acquisition times due to the loop nonlinearities). The decoder operates efficiently despite phase discontinuities at the hop transitions through a novel arrangement of parallel decoders as described below. The use of slow hopping can result in signals that are received at two different satellites being perceived as orthogonal signal sets although they are synchronized for a single satellite. The ground station GS can determine the necessary time and frequency corrections that the new user must employ in order to enter the network in synchronism. This is performed on the net entry channel NEC and is necessary to establish user-GS communications on the traffic channel. The NEC provides a means for the user to transmit a net entry request with high probability of success using the time and frequency information derived by tracking the outbound signal. The use of a lower hop rate on the NEC (than on the traffic channels) allows rapid acquisition of the PN signal despite timing uncertainties.

DESCRIPTION OF THE DRAWINGS

The above and other objects, advantages, and features of the invention will become more apparent when considered with the following specification and accompanying drawings wherein.

DETAILED DESCRIPTION OF THE INVENTION

In order to describe the invention in detail, the embodiment will be discussed as it applies to the return link of a star configured spread spectrum satellite network. The forward communications link 10 includes user signals transmitted from a hub ground station (GS) 12 through a satellite 11 which transponds them to individual users on the ground. The system will typically employ a multibeam antenna 13 which illuminates contiguous "cells" on earth.

Figure 4:
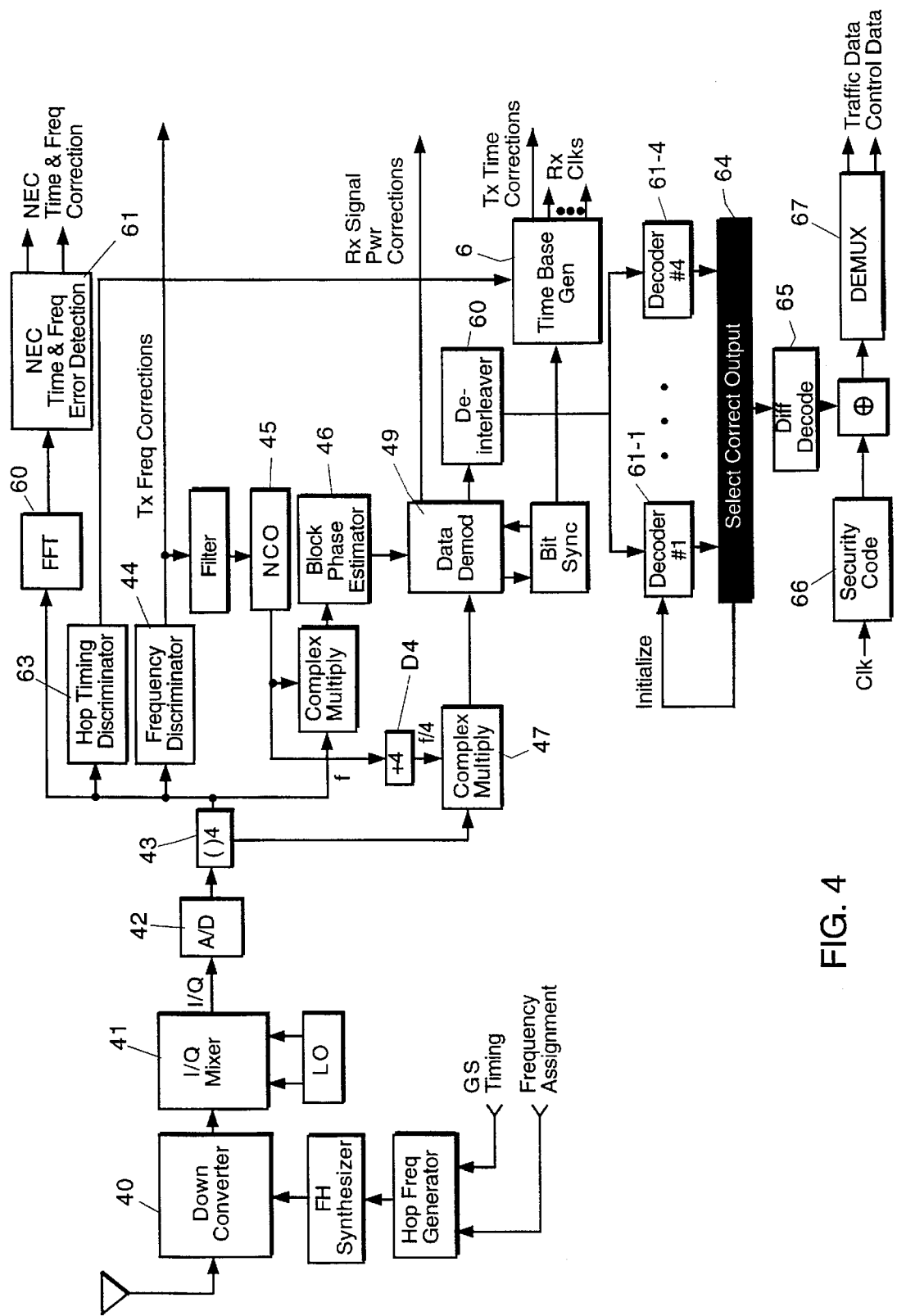
FIG. 4 is a functional block diagram of a ground station return link receiver.

The hub ground station 12 includes antenna means 15 broadcasting the forward link signals 10 (which include the net entry control channel) from a plurality of control channel signal generators 16-1, 16-2 . . . 16-N to the satellite which transponds the signals to a cell on earth where the destination handset 14 is located. Hub ground station 12 also includes a plurality of return link receivers 17-1, 17-2 . . . 17-N (the details of which are shown in FIG. 4), which are coupled to a system controller 18 to provide time, frequency and power correction signals to the control channel generator and the forward link 10. The circuits for providing time, frequency and power correction are illustrated in the functional block diagram of FIG. 4.

Figure 3:
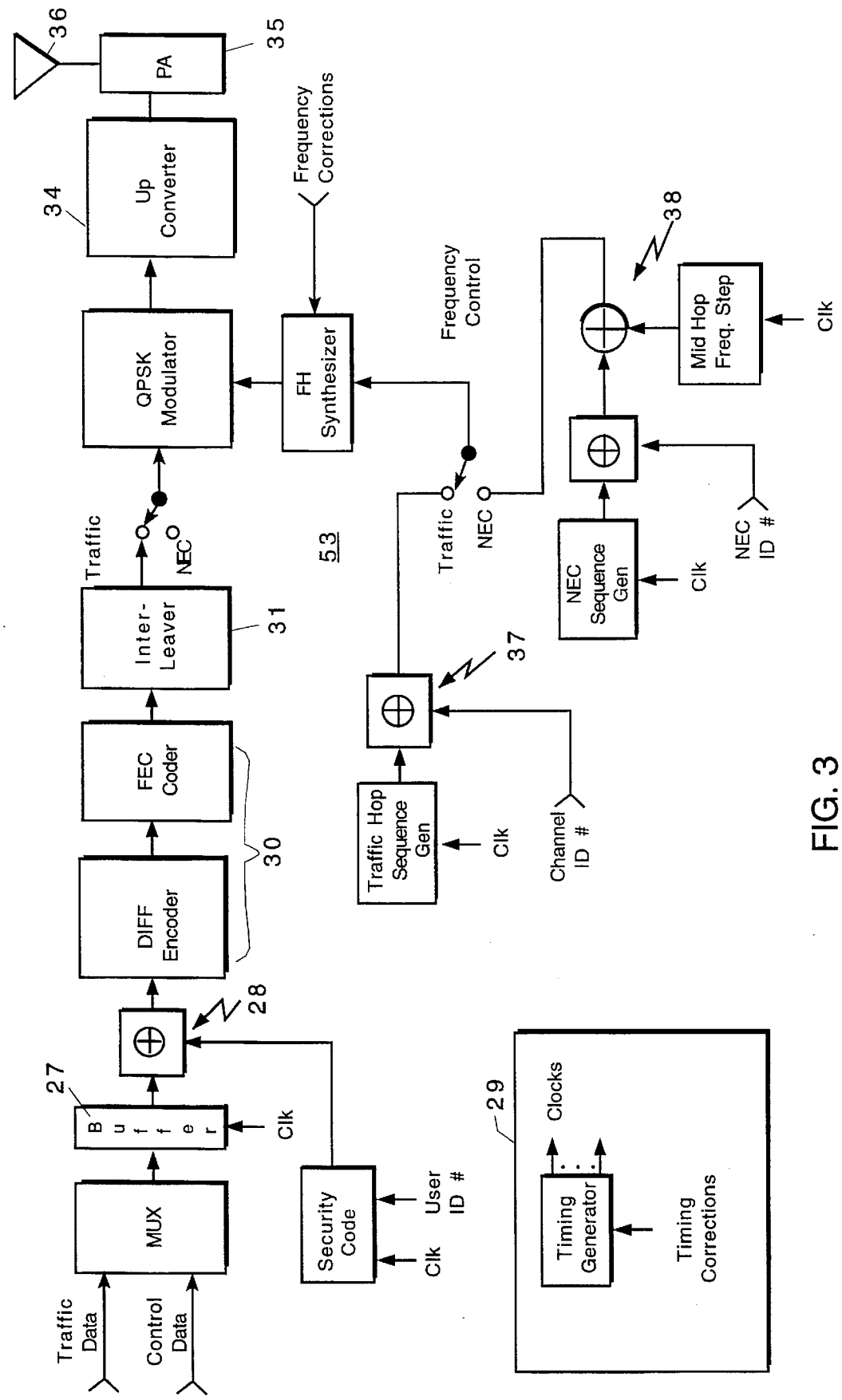
FIG. 3 is a functional block diagram of the subscriber unit return link transmitter.

Each subscriber station 14 includes a control channel receiver 19 which provides the time, frequency and power correction signal from the hub ground station to the subscriber unit return link transmitter 20) which is shown in detail in the functional block diagram of FIG. 3).

In the disclosed embodiment, the forward link signals 10 are assumed to be spread spectrum orthogonal CDMA (OCDMA) in nature, and occupying approximately 2.5 MHz. It is further assumed, for illustrative purposes, that as many as 256 CDMA signals may occupy one of the 2.5 MHz subbands. One or more of these CDMA signals is used by the GS as a "Control Channel" for communication with subscriber handsets (HS) 14 for call set up and network synchronization purposes. It is further assumed that each outbound signal contains in-band control data by which the GS 12 can send synchronization and power control data to the HS while the HS is in active conversation. The system may employ several of the 2.5 MHz subbands.

The GS 12 transmits in several subbands which are "stacked" into an appropriate bandwidth for transmission on the uplink to the satellite. Groups of subbands are then routed to different antenna beams or antennas 13 on the satellite for transmission to individual users on the ground.

Note that the invention disclosed herein refers primarily to the return link 15 and does not depend on the structure of the outbound link except as regards the presence of a control channel.

RETURN LINK SIGNAL DESCRIPTION

The fundamental purpose of the return link 15 is to transmit data from the user handset HS 14 to the ground station GS 12. The data transmission rate will be taken to be 4800 bps for illustrative purposes. A summary of signal parameters for this illustrative embodiment are shown in Table 1.

TABLE 1

Summary of example signal parameters for preferred embodiment.

| ITEM | PARAMETER VALUE | COMMENTS |
| --- | --- | --- |
| Spreading Technique | Orthogonal FH | No access noise |
| Hop Rate | 150 HPS | 3 hops per 20 ms frame |
| Hop Bandwidth | 1.25 MHz | |
| Hop Bin Spacing | 9900 Hz | 126 bins in 1.25 MHz |
| Data Modulation | OQPSK | bandwidth efficient |
| Data Rate | 4800 BPS | |
| Coding Rate | 1/2 | |
| Channel Rate | 4950 SPS | 1 symbol guard time between hops |
| Eb/No for BER = .001 | 4 dB | At least 4 dB better than nonsynchronous CDMA |
| Users links in 2.5 MHz | 228 | |

The return link 15 employs Orthogonal FH (OFH) over a 1.25 MHz subband. Hop bins are spaced by 9900 Hz and there are 126 bins in the subband, accommodating a maximum of 126 orthogonal signals.

The hop rate is 150 HPS, giving a hop period of 6.7 ms. All signals in the subband are received in synchronism at the GS. This is achieved by closing "long" time and frequency tracking loops through the GS by way of the outbound signal control channel.

The hop bins to be used for traffic signaling are numbered from 0 to 113 (the 12 additional bins are used for network entry as discussed below). All subscribers in a frequency subband use the same hop code sequence (h1, h2, . . . hk . . . hK). The user is assigned a Traffic Channel Number (TCN) from 0 to 113. The user adds the TCN to the hop code sequence Mod (114) to determine the transmit hop bin sequence.

Modulation is OQPSK which is bandwidth efficient, power efficient, and relatively tolerant of amplifier nonlinearities. The data is encoded with a R=½ convolutional encoder. The channel transmission rate is 4950 SPS which allows one symbol guard time between hops. There are 33 symbols per hop of which 32 are data symbols. The data is detected using quasi-coherent block phase and frequency estimation techniques.

The Viterbi decoder is implemented in a novel fashion to operate in the presence of a phase discontinuity at the hop transition. To explain this technique, let us assume that a Viterbi decoder has been successfully decoding the data up to the beginning of the present hop. The 32 bits of this hop are demodulated as soft decision symbols, however with a phase ambiguity of ninety degree multiples due to the phase discontinuity at the hop transition and ambiguity of the carrier phase estimator. We now form three other versions of the demodulated data corresponding to 90, 180, and 270 degree rotations of the carrier phase reference. Each of these sets of data is decoded by an independent decoder (total of four), each of which has been initialized to the state of the decoder which successfully decoded the data from the last hop. After the decoding, the branch metrics of the four decoders are checked to find which decoder is most likely correct. The other three decoders are then set to the same state as the successful decoder and this procedure repeated for the next hop.

At start-up, or after a system outage due to fading, the decoding device will resolve the initial phase ambiguity after a few hops (as long as the hop period is at least a few decoder constraint lengths long). This relationship will then be maintained by the decoder device. This system may be used with either transparent or non-transparent codes.

A second novel way to implement the Viterbi decoder operation in the presence of a phase discontinuity at the hop transition is as follows. Because the signal is OQPSK, the phase transitions on the two signal quadratures occur with a time offset of one half symbol. A device which synchronizes to the phase transitions on the received signal can then identify whether the transitions agree with the prior hop or whether there is a 90° rotation. If there is a 90° rotation, this is accounted for by swapping the data on the two signal quadratures. This leaves either a properly aligned signal in phase, or a 180° error. Similar to the above, multiple decoders are used, but now two rather than four are used. All other discussion of the prior paragraph applies to the two decoders, other than the last step where one (rather than three) decoders is set to the same state as the successful decoder.

Both approaches for implementing the Viterbi decoder operation in the presence of a phase discontinuity at the hop transition are applicable to a broad set of applications for burst signals. These include any communication system using any form of phase-shift-keyed modulation (e.g., OQPSK, QPSK, BPSK, multi-level PSK, QASM) where the signals occur in bursts, for the first approach and OQPSK only for the second approach. These include, but are not limited to, Time Division Multiple Access, pocket switching, polled networks. These systems may or may not be spread spectrum. These communication system include but are not limited to satellite, terrestrial cellular, terrestrial radio local area networks, and in-building local area networks.

Slow Hopping

An important feature of this invention is when multiple satellites are to receive and relay the same signal for multi-satellite diversity, either switched or combining. Then by using a slow hop rate in the vicinity of, but not limited to, 1–20 hops/sec, the signals are, in a practical case, non-interfering. Consider the user links to be synchronized and operating through a satellite. All of the signals arrive at the satellite with the same timing and do not interfere with each other (they are orthogonal). When these same signals are seen at a second satellite, their relative timing is different and they interfere with one another, during the time they overlap due to relative timing offsets resulting from different locations on the earth.

By using a slow hopping rate, say 10 hop/second, the hop dwell time is longer (100 ms vs. 6.7 ms for the 150 HPS example). Thus, the fraction of the hop dwell which is corrupted by a 5 ms overlap, for example, is much smaller. The remaining (central) portion of each dwell, which may be in excess of 90% of each hop dwell time may be used for communications with no interference. During the overlap time, the signals could be left on with a synchronization pattern at each end to provide robust synchronization. The overlap sections at each end will not both totally be interfered with. One or the other or portions of both synchronization sections will always be observable and usable. Alternatively, the signals could be turned off in the overlap sections to conserve power to the transmitter.

Return Link Network Entry Channel (NEC)

The return link described above depends on all user HS signals arriving in time and frequency synchronism to remain orthogonal. Once a HS is in the network, synchronism is maintained by detecting small time and frequency errors for each user signal at the GS and sending corrections by way of the in-band control data on the outbound signal. However, initial entry of a HS into the network to place or answer a call is a problem since the HS does not have adequate information to transmit a signal which will arrive at the GS in synchronism with other traffic signals.

This problem is partially mitigated by assuming that the GS compensates the outbound signal to remove the satellite Doppler for users in the center of the antenna beam. The user HS acquires the outbound signal and monitors the control channel before using the NEC. Thus, the HS can use the outbound signal as a time and frequency reference, however a time and frequency error will occur if the HS is off beam center. This initial uncertainty is taken to be $\Delta T = \pm 6$ ms, $\Delta F = \pm 8$ KHz for the present explanation.

Figure 1:
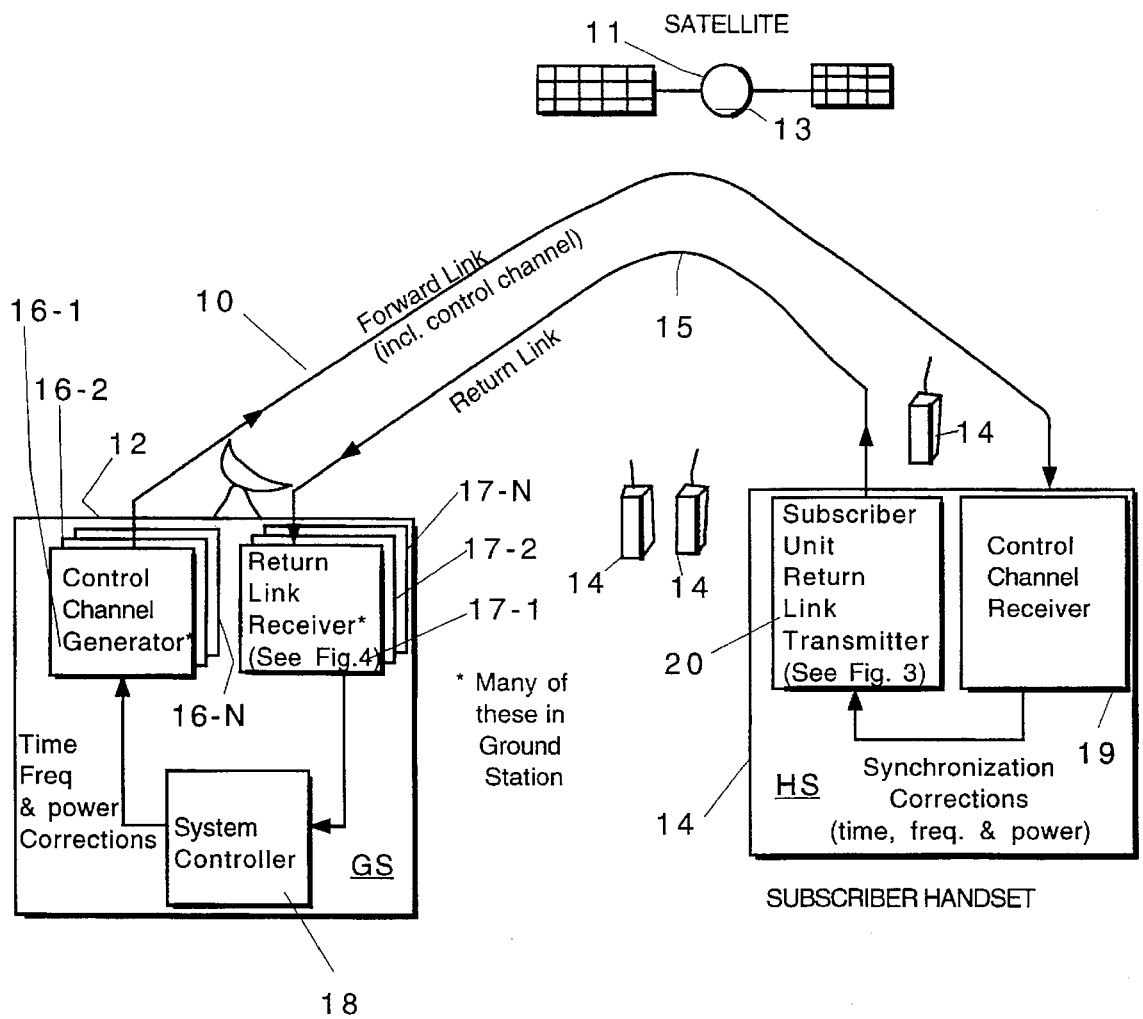
FIG. 1 is a schematic block diagram of the system architecture incorporating the invention.
Figure 2:
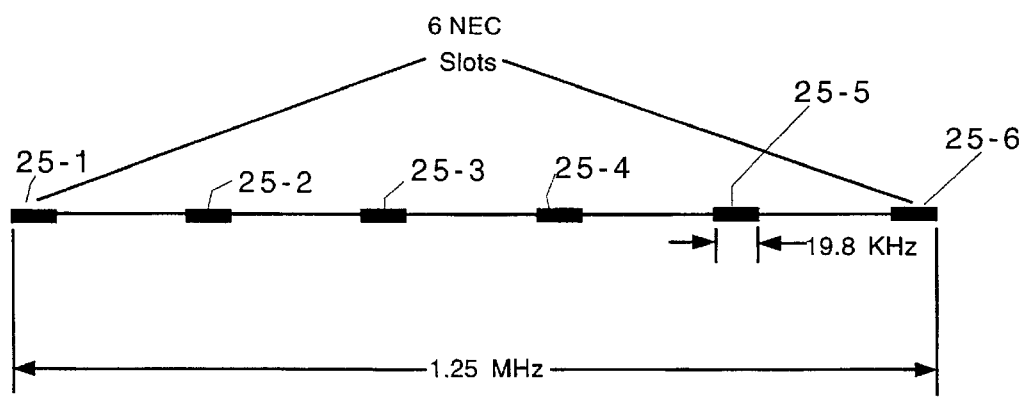
FIG. 2 is a diagrammatic illustration of the signalling subband showing six network entry channels (NEC) frequency bins.

The NEC employs OFH over six frequency hop slots 25-1, 25-2 ... 256-6 that are uniformly spaced over the 1.25 MHz traffic subband as shown in FIG. 2. Each hop slot 25 is 19.8 KHz wide (two contiguous 9.9 KHz traffic hop bins).

The hop rate is 37.5 Hz (150/4), and the transmit frequency starts at 1 KHz above the nominal bin center frequency and is stepped to 1 KHz below the center frequency at the middle of the hop. This transition is used for time tracking. The NEC signal parameters are summarized in Table 2.

TABLE 2

NEC signal parameter summary.

| ITEM | VALUE | COMMENTS |
|---|---|---|
| Hop Rate | 37.5 HPS | $T_H$ = 26.7 ms compared to initial $\Delta T = \pm 6$ ms |
| Hop Bin Width | 19.8 KHz | Initial $\Delta F = \pm 8$ KHz |
| Number of Hop Bins | 6 | Spaced over 1.25 MHz |
| Modulation | 2 KHz frequency step at hop center | Provides a transition for time sync |

The hop code is formed in a similar manner to that for the traffic channels, i.e. six orthogonal hop frequency sequences are generated by adding the NEC number to a hop code sequence.

The NEC is used by the subscriber to place or answer a call. In order to use the NEC, the user HS must have acquired the outbound signal and be monitoring the control channel. Identifiers for unoccupied NEC codes are transmitted to the HS on the control channel. There are a total of 6 codes. The HS selects one of the unoccupied NEC codes and begins to transmit using frequency and time corrections based on the outbound signal.

The GS 14 performs a fast fourier transform FFT (FIG. 4) centered on each of the NEC frequency bins and:

1) Updates the list of unoccupied NEC codes as appropriate.
2) Detects signal collisions and notifies users.
3) Estimates time and frequency offsets on received signals and transmits corrections on the control channel (tagged with the NEC identifier), i.e. the time and frequency pull-in loops are closed through the GS.
4) When the GS 12 determines that the HS 14 is in time and frequency sync, the HS 14 is given a traffic channel assignment.

Transmitter Implementation

A block diagram of the subscriber unit return link transmitter is shown in FIG. 3. The multiplexed input data (control and traffice) is buffered 27 and then covered with a long security code 28 which is synchronized with the system clock 29. The data is coded 30, interleaved 31 and then OQPSK modulated 32 onto the hopped carrier 33, after which it is upconverted 34 and amplified 35 for transmission via antenna 36. In traffic 37 and net entry channel 38 mode, the hop timing is synchronized with the symbol timing.

Receiver Implementation

The return link receiver is implemented in the ground station GS, and a functional block diagram is shown in FIG. 4. The received signal is first down converted 40 and dehopped with the hop sequence synchronized to the station clock as shown. The dehopped signal is converted 41 to baseband using I and Q mixers, where it is then digitized 42.

The sampled signal is passed through a fourth power nonlinearity 43 to remove the data modulation. The frequency error (referenced to zero) of the resulting cw signal, which is four times that of the carrier, is measured with a frequency discriminator 44 (typically a Cross Product Discriminator or an FFT based discriminator) and passed to the system controller which computes a correction to be transmitted to the user HS 14 on the outbound control link.

The frequency error is also averaged and passed to an Number Controlled Oscillator (NCO) 45 and complex multiplier which removes the estimated error in a feed-forward manner. A Block Phase Estimator (BPE) 46 is used to estimate the phase of the corrected output.

The NCO 45 output frequency is also divided 46 by four and mixed 47 with the baseband signal to yield a frequency corrected baseband signal with data modulation. This signal is demodulated 49 using the phase estimate from the BPE. As illustrated, the necessary symbol timing is also derived from the baseband signal.

The symbol synchronizer output is used in conjunction with the hop timing discriminator 63 to calculate a very accurate estimate of the hop timing offset. This estimate is forwarded to the system controller 18 which computes a correction to be transmitted to the user HS on the outbound control link 10.

The soft-decision demodulated data is deinterleaved 60 and decoded on a hop basis using four decoders 61-1 . . . 61-4 to resolve the phase ambiguity after the hop transition as described above. The selected correct output 64 is differentially decoded 65. A security code 66 is mixed with the output and demultiplexed 67 to provide the traffic data and control data.

While preferred embodiments of the invention have been described and illustrated, it will be appreciated that other embodiments of the invention will be readily apparent to those skilled in the art that various other embodiments, adaptations and modifications of the invention are possible.

What is claimed is:

1. In a satellite network communication system in which a plurality of subscriber handset terminals communicate with a ground hub station on traffic channels using spread spectrum orthogonal CDMA transmissions, the improvement comprising, said hub station including a control generator for generating a net entry control channel for communicating synchronization correction signals, including timing, frequency and power to said subscriber handset terminals and a return link receiver means, each subscriber handset terminal having a subscriber unit control channel receiver for receiving said synchronization correction signals, a subscriber unit return link transmitter connected to receive said synchronization correction signals so that signals from all subscriber handset terminals arrive at said hub station in time and frequency synchronism, said subscriber unit return link transmitter including frequency hopped spread spectrum carrier such that none of the signals occupies the same frequency bin at the same time.

2. The satellite network communication system defined in claim 1 wherein time and frequency correction signals are transmitted to each of said plurality of subscriber handset terminals via said net entry control channel.

3. The satellite network communication system defined in claim 1 wherein each return link receiver means includes a data demodulator including frequency and phase estimation means for controlling said demodulator.

4. The satellite network communication system defined at claim 1 wherein said return link receiver means includes an array of parallel decoders.

5. The satellite network communication system defined in claim 1 wherein said frequency hopping is at a relatively low rate in order to enhance performance when receiving the same user signal from two satellites simultaneously.

6. The satellite network communication system defined in claim 1 wherein said net entry control channel at said ground hub station incudes means for providing time and frequency corrections to subscriber handset terminals necessary to establish subscriber to ground hub station communications on said traffic channels.

7. The satellite network communication system defined in claim 5 wherein the hop rate on said net entry control channel is lower than the hop rate on said traffic channels.

8. The satellite network communication system defined in any one of claims 1–7 wherein each hub station and subscriber handset terminal includes means to modulate said signals on a carrier using orthogonal QPSK.

\* \* \* \* \*